United States Patent [19]
Calandruccio

[11] Patent Number: 5,955,965
[45] Date of Patent: Sep. 21, 1999

[54] BICYCLE LOCATING SYSTEM

[76] Inventor: Michael J. Calandruccio, 8243 Cedar Landing Ct., Alexandria, Va. 22306

[21] Appl. No.: 08/808,445

[22] Filed: Mar. 10, 1997

[51] Int. Cl.[6] .................................................... B60R 25/10
[52] U.S. Cl. .............................. 340/825.49; 340/572.1; 340/573.1; 340/825.54
[58] Field of Search ............................. 340/825.49, 572, 340/573, 825.54

[56] References Cited

U.S. PATENT DOCUMENTS

| | | | |
|---|---|---|---|
| 4,177,466 | 12/1979 | Reagan | 340/825.49 |
| 4,188,614 | 2/1980 | Habib, Jr. | 340/63 |
| 4,379,281 | 4/1983 | Thomas | 340/63 |
| 4,797,671 | 1/1989 | Toal, Jr. | 340/825.49 |
| 4,818,998 | 4/1989 | Apsell et al. | 342/44 |
| 4,837,700 | 6/1989 | Ando et al. | 364/449 |
| 5,043,736 | 8/1991 | Darnell et al. | 342/357 |
| 5,086,377 | 2/1992 | Roberts | 362/102 |
| 5,418,537 | 5/1995 | Bird | 342/357 |
| 5,534,847 | 7/1996 | McGregor | 340/432 |

OTHER PUBLICATIONS

Mary Belferman, "The Big Wheels Deal?; Bicycle Thefts Are Booming", *The Washington Post*, Tuesday, Nov. 15, 1994, p. C5.

David Leonhardt, "Bike Thefts on the Rise; Police Suspect a Ring", *The Washington Post*, Thursday, May 11, 1995, p. M1.

*Primary Examiner*—Brian Zimmerman
*Assistant Examiner*—Yves Dalencourt

[57] ABSTRACT

A bicycle having a locating system attached thereto. The locating system responds to a call signal from a call station by transmitting a locator signal to a locator station. This allows for quick and easy tracking and recovery of missing or stolen bicycles.

15 Claims, 4 Drawing Sheets

BICYCLE LOCATING SYSTEM

This application is for an invention previously described in my Disclosure Document No. 390153 filed Jan. 4, 1996 in the United States Patent Office under the Disclosure Document Program. Said Disclosure Document is hereby incorporated by reference in its entirety.

FIELD OF THE INVENTION

This invention relates to a remote locating system to assist in the retrieval of lost or stolen bicycles.

BACKGROUND OF THE INVENTION

Throughout the years, bicycles have become very costly, especially for those individuals who are bicycle enthusiasts and are involved in the various bicycle racing circuits. These people desire the latest state-of-the-art features on their bicycles which make them very expensive. Coupled with the popularity of such expensive bicycles there has been an increase in the theft rate of bicycles, especially in the urban areas. See David Leonhardt, "Bike Thefts on the Rise . . . ", *The Washington Post*, May 11, 1995, pg. M1.

In the past, there were different methods of preventing theft by locking a bicycle frame or wheel. See Mary Belferman, "The Big Wheels Deal? . . .", *The Washington Post*, Nov. 15, 1994, pg. C5. These methods have been found to be ineffective against the determined criminal. These locking devices can be broken off the entire frame in a matter of minutes, and the bicycle can then be ridden off and transported away. Internal locking methods such as locking a steering column and similar parts have been found to be ineffective since the locking device can be rendered inoperative or the entire vehicle, lock and all, can be transported away. Other methods include audible alarms attached to or beside the bicycle to alert the owner and to discourage the theft. See, for example, Thomas, U.S. Pat. No. 4,379,281. Due to a number of circumstances, however, these past devices have faltered in the prevention of theft. For example, these audible alarms are often simply ignored or are disconnected in a short period of time. Most importantly, once these anti-theft and locking devices have been overcome, the bicycle owner often has no way to locate the missing or stolen bicycle.

A remote cycle alarm system has been described by Habib, Jr. in U.S. Pat. No. 4,188,614. This remote alarm provides an audible alarm at a remote distance from the bicycle. The alarm is portable and can be carried by the owner to alert him of an attempted theft when he is at a remote distance. This system also has a serious disadvantage in that the owner at a remote distance must return to the location of the bicycle within a certain period of time in order to prevent the theft. Once the theft has occurred, the owner would have no way to locate and recover the stolen bicycle. The audible alarm also does not help when the bicycle is simply lost by the owner.

There is a significant need in the art for a anti-theft device that allows the owner of a missing or stolen bicycle to locate the bicycle after it has been lost or stolen. To date, and despite this significant need in the art, there has been no effective solution to the problem of recovery of stolen bicycles.

SUMMARY OF THE INVENTION

This invention is directed to an anti-theft and locating system for bicycles that solves the aforementioned problems in the art and satisfies the long felt need in the art to effectively recover missing or stolen bicycles.

Accordingly, it is an object of the invention to provide a bicycle comprising a frame, and a locating system attached to the frame, which locating system responds to a call signal from a call station by transmitting a locator signal to a locator station. This allows for quick and easy tracking and recovery of missing or stolen bicycles. As used herein, "frame" is intended to mean all parts of the bicycle which are non-moving during normal use, such as the frame tubing, the seat and the seat tube. The word "bicycle" is intended to include bicycles powered by electricity.

In one embodiment, the locating system comprises a transponder, a power supply and an electrical connection between the transponder and the power supply, wherein the transponder responds to a call signal from a call station by transmitting a locator signal to a locator station.

The transponder, power supply and/or electrical connection are preferably in a concealed location. All the components may be located within the frame tubing. It is also possible that the transponder or power supply be located underneath the seat. This opening underneath the seat is optionally sealed with a metal plate for concealment. When the transponder or power supply are located within the frame tubing or underneath the seat which is sealed with a metal plate, the frame tubing or metal plate can contain an opening system to allow for easy access to the transponder and/or power supply.

DETAILED DESCRIPTION

The locating system which is attached to the bicycle is one which responds to a call signal from a call station by transmitting a locator signal to a locator station. The locator signal is received and processed by one or more-locator stations to give a location indicator. The location indicator is used to locate the missing or stolen bicycle.

Such locating systems are known in the art with respect to automobiles and generally comprise a transponder, a power supply and an electrical connection between the transponder and the power supply. The transponder responds to a call signal from a call station by transmitting a locator signal to a locator station. The locator signal is used to locate the missing automobile. See Reagan, U.S. Pat. 4,177,466 and Apsell et al., U.S. Pat. 4,818,998. Although these patents discuss using such locating systems to assist in the location of missing automobiles, there is no teaching or suggestion that such devices should be used in connection with bicycles.

Under my invention, the locating system is used in connection with a bicycle and the locator signal is then used to accurately locate the missing or stolen bicycle. The transponder used by Reagan may take the form of various commercially available units of this type of circuit, and such circuits may be miniaturized with state-of-the-art solid state techniques. Since the power requirements of the transponder can be relatively small if an integrated circuit is used, the battery used as a power supply may also be small and therefore readily concealed.

Figure 1:
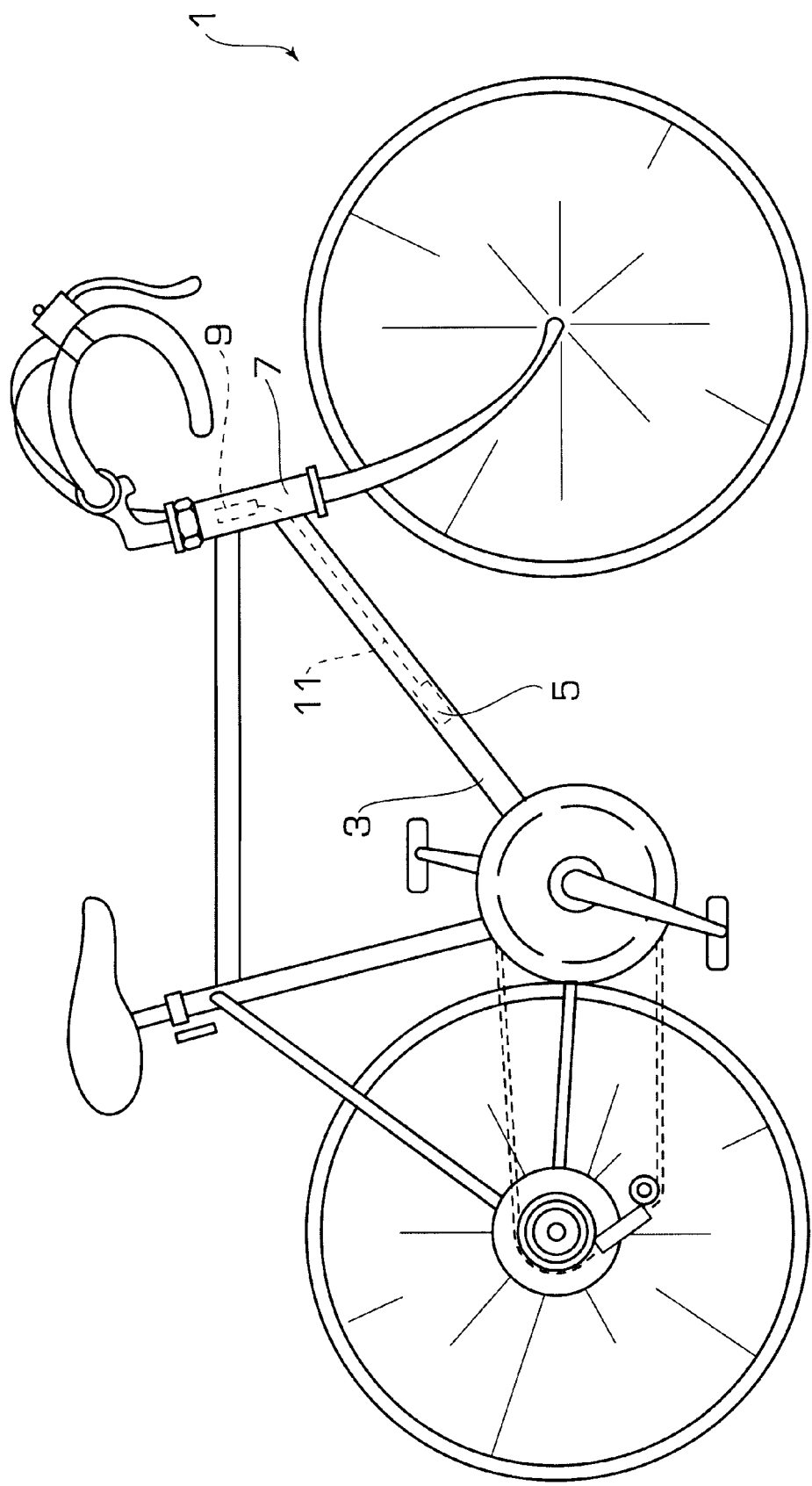
FIG. 1 shows a bicycle of the invention wherein the locating system is located entirely within the bicycle frame tubing.

Referring now in detail to the drawings, FIG. 1 show a preferred embodiment of the bicycle 1 of the invention. The bicycle 1 contains a transponder 5 located within the bottom frame tube 3. The transponder 5 is attached through an electrical connection 11 to a power supply 9 located within the front frame tube 7.

Figure 2:
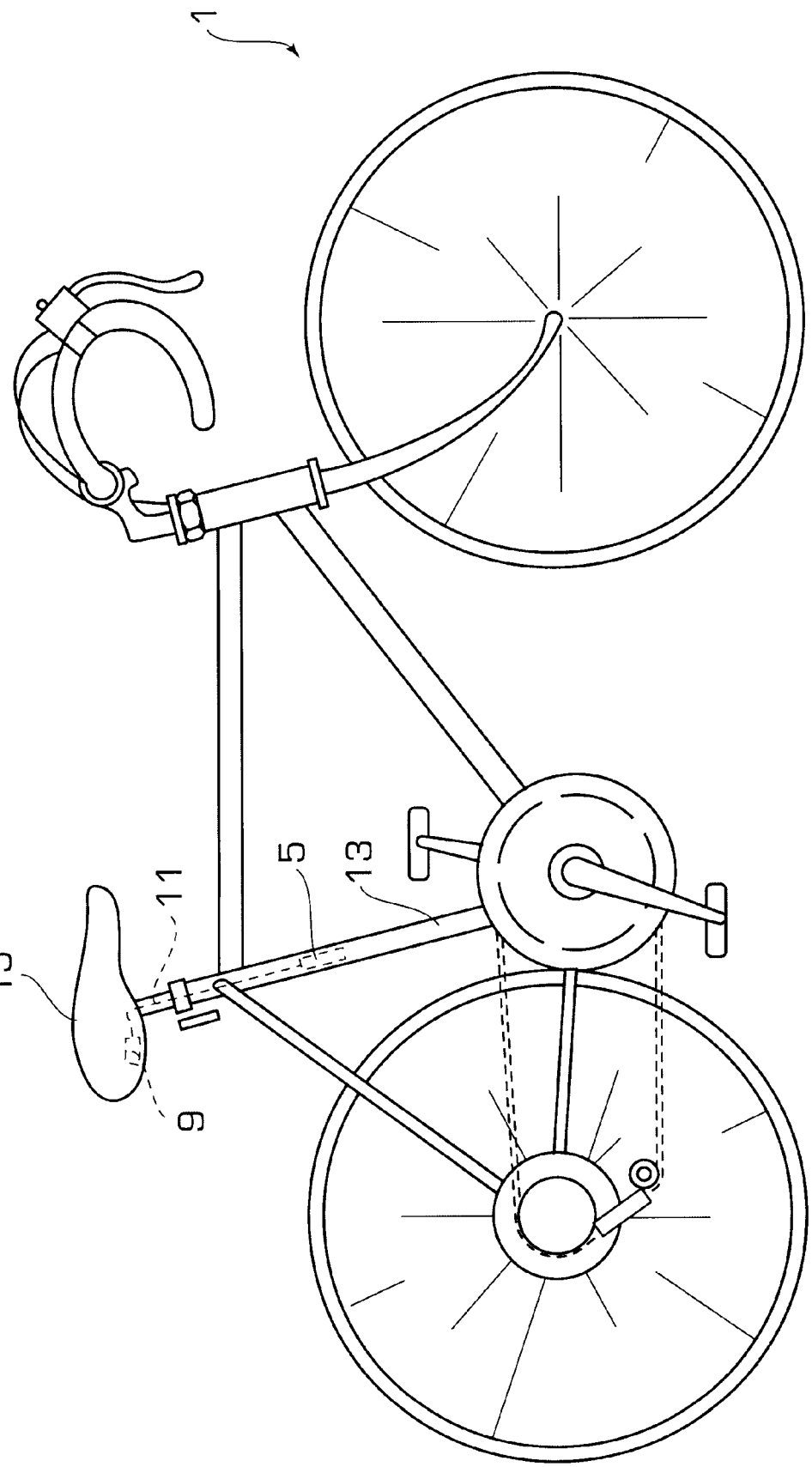
FIG. 2 shows a bicycle of the invention wherein the transponder and electrical connection is located within the frame tubing and the power supply is located under or within the bicycle seat.
Figure 3:
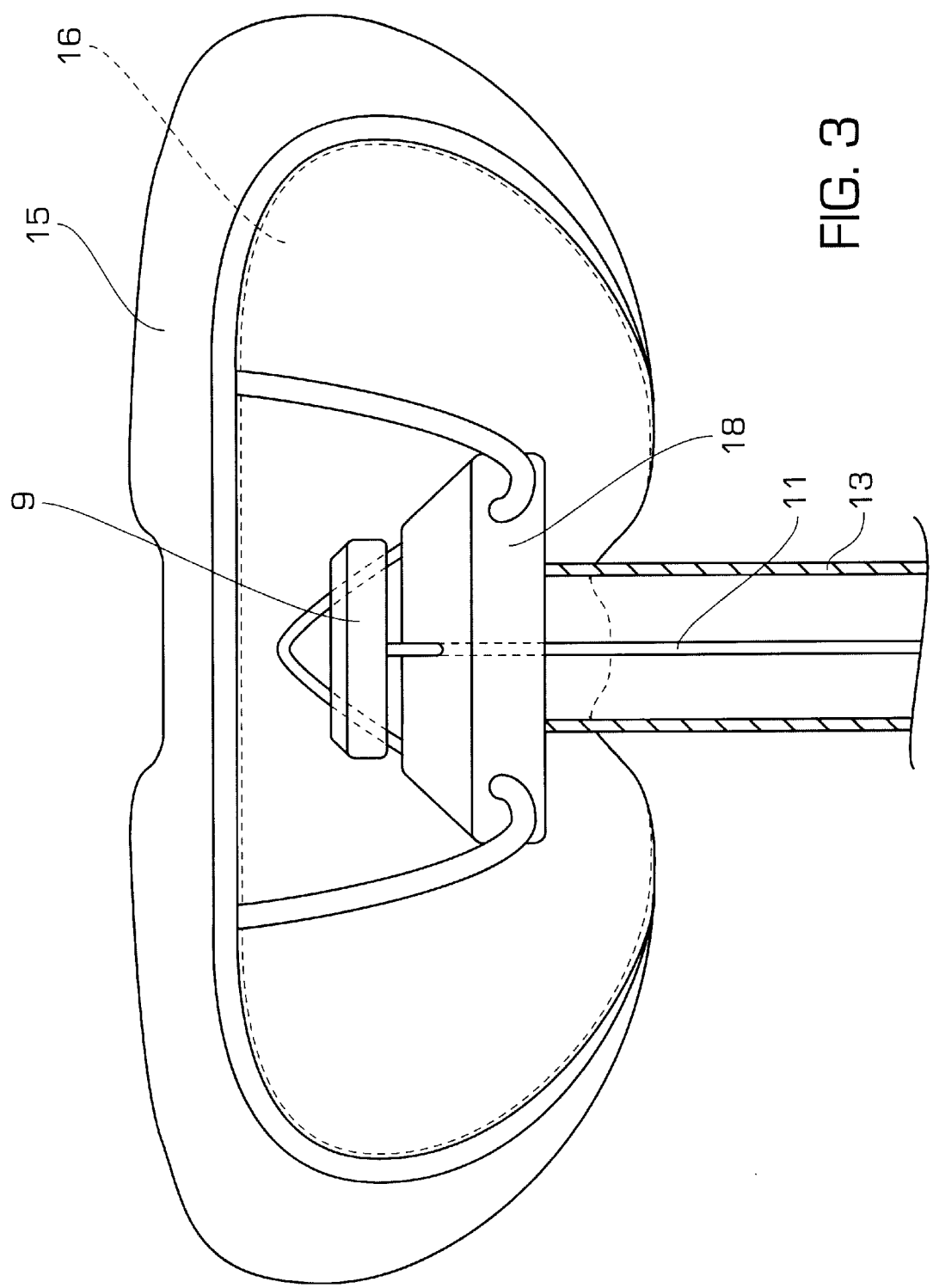
FIG. 3 shows a rear view of the bicycle seat having the power supply attached to the underside thereof.

FIG. 2 show another preferred embodiment of the bicycle 1 of the invention. The bicycle 1 contains a transponder 5 located within the seat frame tube 13. The transponder 5 is attached through an electrical connection 11 to a power supply 9 located within or under the seat 15. The embodiment where the power supply is located under the seat is shown in FIG. 3. FIG. 3 shows a rear view of the seat 15. The seat 15 has a conventional seat bracket 18 attached thereto which attaches the seat 15 to the seat frame tube 13. The power supply 9 is located above the seat bracket 18 whereby the power supply is totally or partially concealed from normal view from the rear of the bicycle. The power supply 9 is attached through the electrical connection 11 to the transponder 5 (not shown). The electrical connection 11 is totally concealed within the seat frame tube 13. The bottom part of the seat 15 can optionally be sealed by a metal seat plate 16 which conceals all the parts from view.

Figure 4:
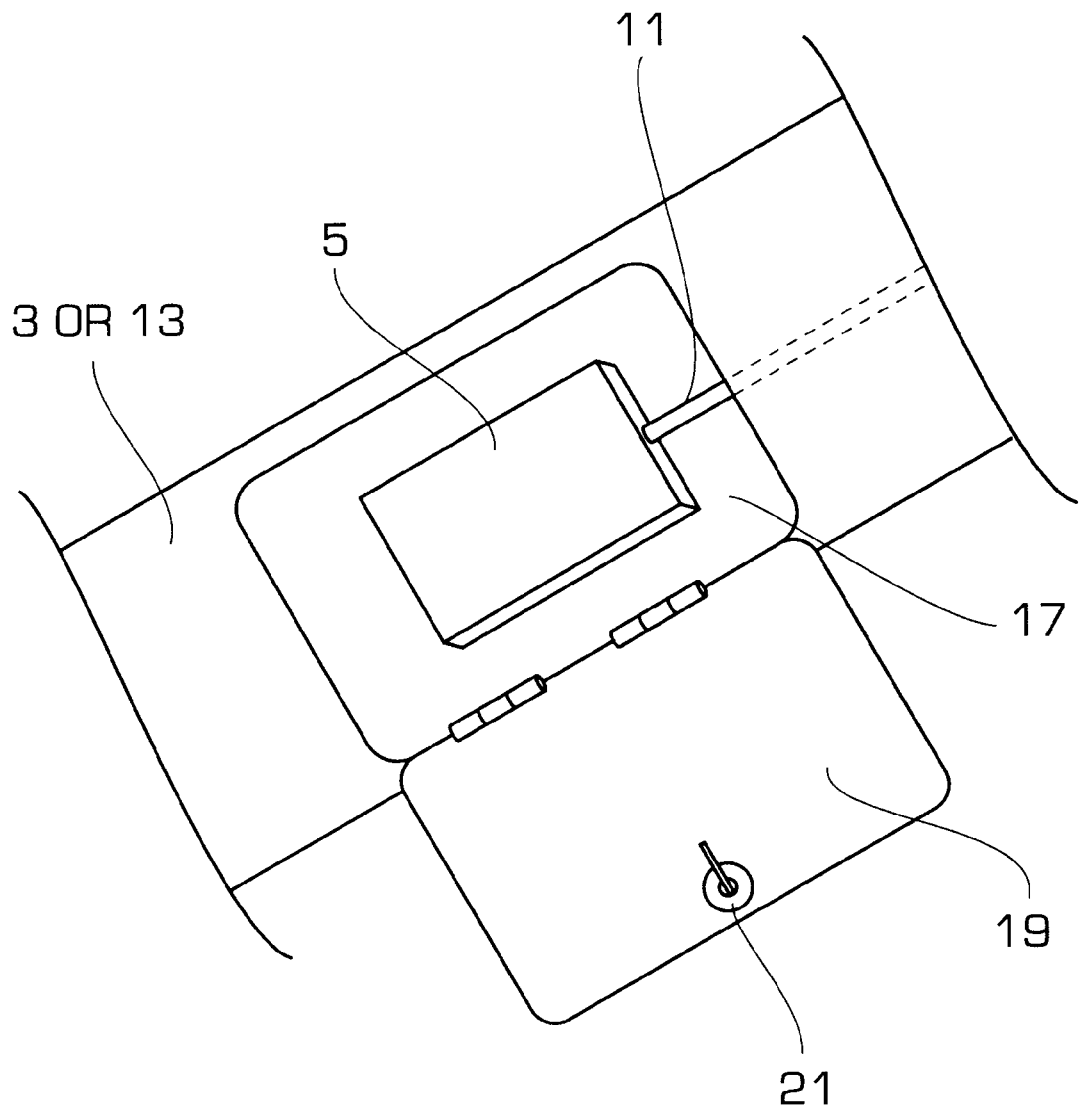
FIG. 4 shows an example of a lockable opening system within the frame tubing which is used to access a transponder.

FIG. 4 shows another preferred embodiment of the invention wherein the bottom frame tube 3 or seat frame tube 13 is provided with a frame tube opening 17 which allows easy access to the transponder 5 located within the frame tube. The transponder S is attached through the electrical connection 11 to the power supply 9 (not shown). This easy access to the transponder 5 is necessary to allow for repair or replacement thereof. The frame tube opening 17 is provided with a frame tube opening door 19 having a locking mechanism 21. The frame tube door can be any conventional hinge type door, and the locking mechanism 21 can be provided with a conventional miniature key or combination lock to prevent unauthorized entry. If the power supply (not shown) is also located within one of the frame tubes, the frame tube near the power supply can similarly be equipped with a frame tube opening 17, frame tube opening door 19 and door locking mechanism 21 to allow easy access thereto.

Under my invention, it is readily apparent that the components of the locating system can be attached to the bicycle in any number of different ways. In the preferred embodiments shown in FIGS. 1 and 2 the transponder and/or power supply are located within the frame tubes. This can be accomplished by attachment inside the frame tube during or after manufacture of the frame. The attachment to the frame can be by any type of attachment which would make the transponder and power supply sufficiently secure and yet concealed. For example, said attachment could be by bolting, screwing or welding to the frame tube or any one of its components.

In any case, it is desirable to have the transponder, power supply and electrical connection concealed from normal view, as this will prevent an unauthorized person from locating and dismantling the device. This can be accomplished by concealing one or more of the parts of the locating system within the bicycle frame tubes or under the bicycle seat. Preferred examples of such concealment are shown in FIGS. 1–4. Regarding the electrical connection, it is also possible to disguise it as a conventional bike cable.

Regarding the embodiment in FIG. 3 wherein the power supply 9 under the seat 15 is totally concealed by a seat plate 16, the frame tube opening 17, frame tube opening door 19 and door locking mechanism 21 of FIG. 4 can be adapted to be used in the seat plate 16 of FIG. 3 to allow easy access to the power supply 9.

The locating system used in connection with the bicycle would be operated in the same fashion that automobile locator systems have been operated. See, for example, the extensive discussions in the aforementioned Reagan and Apsell et al. U.S. Patents. For example, when the bicycle is found to be missing or stolen, the individual need only report this information to the local police department. The police department, as a call station, would transmit a coded call signal to all parts of the geographic area served by the system. If the missing bicycle is within range of the call station, the locating system on the bicycle would be activated by the call signal to transmit a locator signal. When the locator signal is picked up by an antenna of one or more locator stations, the direction of the missing bicycle with respect to the station can be established by means of a location indicator. The latter may comprise a proximity detector or a radio direction finder. See, e.g., the discussion in Reagan, U.S. Pat. No. 4,177,466.

While there has been illustrated and described what is at present to be preferred embodiments of the present invention, it will be understood by those skilled in the art that various changes and modifications may be made and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiments disclosed as a best mode contemplated for carrying out this invention, but the invention will include all embodiments falling in the scope of the appended claims.

I claim:

1. A bicycle comprising a frame, and a locating system attached to said frame, wherein said locating system comprises a transponder, a power supply, and an electrical connection between said transponder and said power supply, wherein the transponder and/or the power supply are located within a frame tubing, and wherein said locating system responds to a call signal from a call station by transmitting a locator signal to a locator station.

2. A bicycle as in claim 1 wherein the transponder and the power supply are located within the frame tubing.

3. A bicycle as in claim 1 wherein the frame tubing comprises an opening system to access the transponder and/or the power supply.

4. A bicycle as in claim 2 wherein the frame tubing comprises opening systems to access the transponder and the power supply.

5. A bicycle as in claim 1 wherein the transponder is located within the frame tubing and the power supply is attached to the underside of a bicycle seat.

6. A bicycle as in claim 3 wherein the transponder is located within the frame tubing and the power supply is attached to the underside of a bicycle seat.

7. A bicycle as in claim 1 wherein the electrical connection is located within the frame tubing.

8. A bicycle as in claim 2 wherein the electrical connection is located within the frame tubing.

9. A bicycle as in claim 1 wherein the bicycle is powered by electricity.

10. A bicycle comprising a frame, and a locating system attached to said frame, wherein said locating system comprises a transponder, a sower supply, and an electrical connection between said transponder and said power supply, wherein the transponder and/or the power supply are attached to the underside of a bicycle seat, and wherein said locating system responds to a call signal from a call station by transmitting a locator signal to a locator station.

11. A bicycle as in claim 10 wherein the underside of the bicycle seat is concealed by a metal seat plate.

12. A bicycle as in claim 11 wherein said metal seat plate comprises an opening system to access the transponder and/or the power supply.

13. A bicycle as in claim 10 wherein the bicycle is powered by electricity.

14. A bicycle comprising a frame, and a locating system attached to said frame, wherein said locating system comprises a transponder, a power supply, and an electrical connection between said transponder and said power supply, wherein the electrical connection is located within a frame tubing, and wherein said locating system responds to a call signal from a call station by transmitting a locator signal to a locator station.

15. A bicycle as in claim 14 wherein the bicycle is powered by electricity.

* * * * *